UNITED STATES PATENT OFFICE.

CHARLES W. DOUGHTY, OF AUGUSTA, GEORGIA.

ABSORBENT FOR NIGHT-SOIL.

SPECIFICATION forming part of Letters Patent No. 429,190, dated June 3, 1890.

Application filed June 13, 1889. Serial No. 314,147. (No specimens.)

*To all whom it may concern:*

Be it known that I, CHARLES W. DOUGHTY, a citizen of the United States, residing at Augusta, in the county of Richmond, State of Georgia, have invented certain new and useful Improvements in Night-Soil Deodorizing, Evaporating, and Utilizing Means, of which the following is a specification.

My invention relates to a new and useful improvement in the means and proportions of materials used for the deodorization, evaporation, and, to a certain extent, decomposition, of human excrement, and its transformation into a nearly inodorous and valuable fertilizer.

The material consists of calcareous marl, well dried and finely pulverized, and the means employed are ordinary privy-boxes in closets, preferably provided with means commonly used to produce circulation of air therein. The component parts of marl are found by analysis generally to be:

| | |
|---|---:|
| Lime carbonate | 80.0 |
| Oxide of iron | 4.3 |
| Alumina | .6 |
| Organic matter | .7 |
| Magnesia | .4 |
| Phosphoric acid | 2.0 |
| Silica (soluble) | 2.0 |
| Sand (insoluble) | 10.0 |
| | 100.0 |

This native mineral—marl—is first mechanically treated as follows: It is dried by artificial heat at a temperature below 400° Fahrenheit, (a higher temperature will expel the carbonic acid,) and then comminuted and ground about as fine as flour, and stirred at the same time. This material thus prepared is then inclosed in bags or barrels to facilitate its transportation. To properly use it, about fifty pounds of said dried pulverized marl are placed in an empty privy-receptacle and the latter is ready for use. The urine dropped upon it is absorbed and the liquid in the solids is mostly extracted by absorption from the dried marl under it and the dry air over it, and a few ounces of the powdered marl may from time to time be dropped upon the deposits.

The pulverized dried marl has the property of combining with and fixing putrescible matter, whether animal or vegetable, and preventing putrefactive decomposition. By this physical or chemical action and evaporating process the fecal deposit becomes dried about as fast as deposited from day to day, and the marl becomes charged with the concentrated mineral, animal, and vegetable elements of ten times its weight of fecal matter.

I am aware that undesiccated marl has been used as one of the elements of compost-manure, but in that form it is a cold, tenacious, and but little absorbable substance, and would be nearly useless in privy-boxes.

What I claim as my invention is—

1. An absorbent and evaporating medium for night-soil, consisting of artificially dried and pulverized marl, substantially as described.

2. Artificially dried and pulverized marl in the bottom of privy-boxes, in combination with said boxes, substantially as and for the purpose described.

In testimony whereof I affix my signature in presence of two witnesses.

CHARLES W. DOUGHTY.

Witnesses:
GEO. W. LAX,
S. J. BLOSSMAN.